(12) United States Patent
Martin

(10) Patent No.: US 6,652,761 B2
(45) Date of Patent: Nov. 25, 2003

(54) METHOD OF RECYCLING WASH-WATER RESULTING FROM FILM TREATMENT

(75) Inventor: Didier J. Martin, Givry (FR)

(73) Assignee: Eastman Kodak Company, Rochester, NY (US)

( * ) Notice: Subject to any disclaimer, the term of this patent is extended or adjusted under 35 U.S.C. 154(b) by 83 days.

(21) Appl. No.: 10/051,426

(22) Filed: Jan. 18, 2002

(65) Prior Publication Data

US 2002/0153293 A1 Oct. 24, 2002

(30) Foreign Application Priority Data

Feb. 19, 2001 (FR) .......................................... 01 02203

(51) Int. Cl.⁷ .............................................. B01D 17/12
(52) U.S. Cl. ..................... 210/805; 210/195.2; 210/196
(58) Field of Search ........................... 210/195.1, 195.2, 210/196, 805

(56) References Cited

U.S. PATENT DOCUMENTS 6,048,614 A * 4/2000 Rohrbach et al. ........... 428/372

FOREIGN PATENT DOCUMENTS

| EP | 0 231 432 | 8/1987 |
| EP | 0 932 078 A | 7/1999 |
| GB | 2 141 037 A | 12/1984 |
| GB | 2 263 476 A | 7/1993 |

OTHER PUBLICATIONS

Textbook—Munir Cheryan; Ultrafiltration and Microfiltration Hanbook; Technomic Publishing Company; p. 268.

* cited by examiner

Primary Examiner—Chester T. Barry
(74) Attorney, Agent, or Firm—J. Jeffrey Hawley

(57) ABSTRACT

The invention relates to a method of recycling wash-water resulting from the treatment of a film provided with a carbon particles based backing layer, and especially from a washing treatment to remove the said carbon particles based backing layer. The method comprises the step of passing the wash-water through an microfiltration unit equipped with a microfiltration membrane made from a polytetrafluorethylene-based membrane. The method enables the regeneration of the wash-water and its recycling with a high efficiency and considerable lowering of the water consumption used in this step of the processing.

5 Claims, 1 Drawing Sheet

METHOD OF RECYCLING WASH-WATER RESULTING FROM FILM TREATMENT

FIELD OF THE INVENTION

The present invention relates to the treatment of films comprising a carbon particles based backing layer, and in particular the recycling of wash-water resulting from passing such a film through a wash-tank to remove the said backing layer.

BACKGROUND OF THE INVENTION

Some films, and especially motion picture films, have antihalation protection in the form of a removable backing layer, comprising a first layer containing carbon particles and a second wax layer The said first layer is obtained by coating a dispersion, in solvent medium, of carbon particles in a soluble binder in an alkaline medium, cellulose acetophthalate. After having played its antihalation protection part, the backing layer is removed, after passing through a prebath in which it is sufficiently softened, by rinsing in a first wash-tank, before development of the film. The rinsing device generally uses water jets whose action can be combined with the action of brushing rollers. The flow rate of these water jets is high (100 1/h to 150 1/h), which causes high water consumption in this treatment step. In addition, the wash-water is charged especially with particles of carbon that are carried off, and has high turbidity and a pH more than 8. Up to now, this wash-water is not usually treated, and is discharged as it is. Whereas, new standards in particular require reduced water consumption for photographic processing and prohibit the discharge of waste water directly into the drains without prior treatment, such as pH adjustment and filtering. One solution to meet these new standards is to prefer wash-water recycling. This means that most of the carbon particles have to have been removed in order to reuse the wash-water with no impact on the film's sensitometric characteristics. This removal of the carbon particles must be carried out with high efficiency and without damaging the filtering material used.

The present invention provides a treatment method to answer the above-mentioned problems and enable the recycling of the wash-water charged with carbon particles with high efficiency.

The invention provides also a treatment method to enable water consumption to be greatly reduced and to obtain recycled water, which can be used in the treatment process without harming the qualities of the processed film.

SUMMARY OF THE INVENTION

The present invention is a method of recycling wash-water resulting from the treatment of a film provided with a carbon particles backing layer, especially comprising treatment in a prebath followed by washing to remove the said carbon particles based backing layer, wherein said method comprises the step of passing said wash-water through an microfiltration unit equipped with a microfiltration membrane made of polytetrafluorethylene-based material, wherein a permeate is obtained, and wash-water free of said carbon particles is obtained in said permeate.

Hereafter, polytetrafluorethylene will be called PTFE.

The method according to the invention enables the removal from wash-water of the carbon particles; the water can then be recycled with high efficiency.

DETAILED DESCRIPTION OF THE INVENTION

Figure 1:
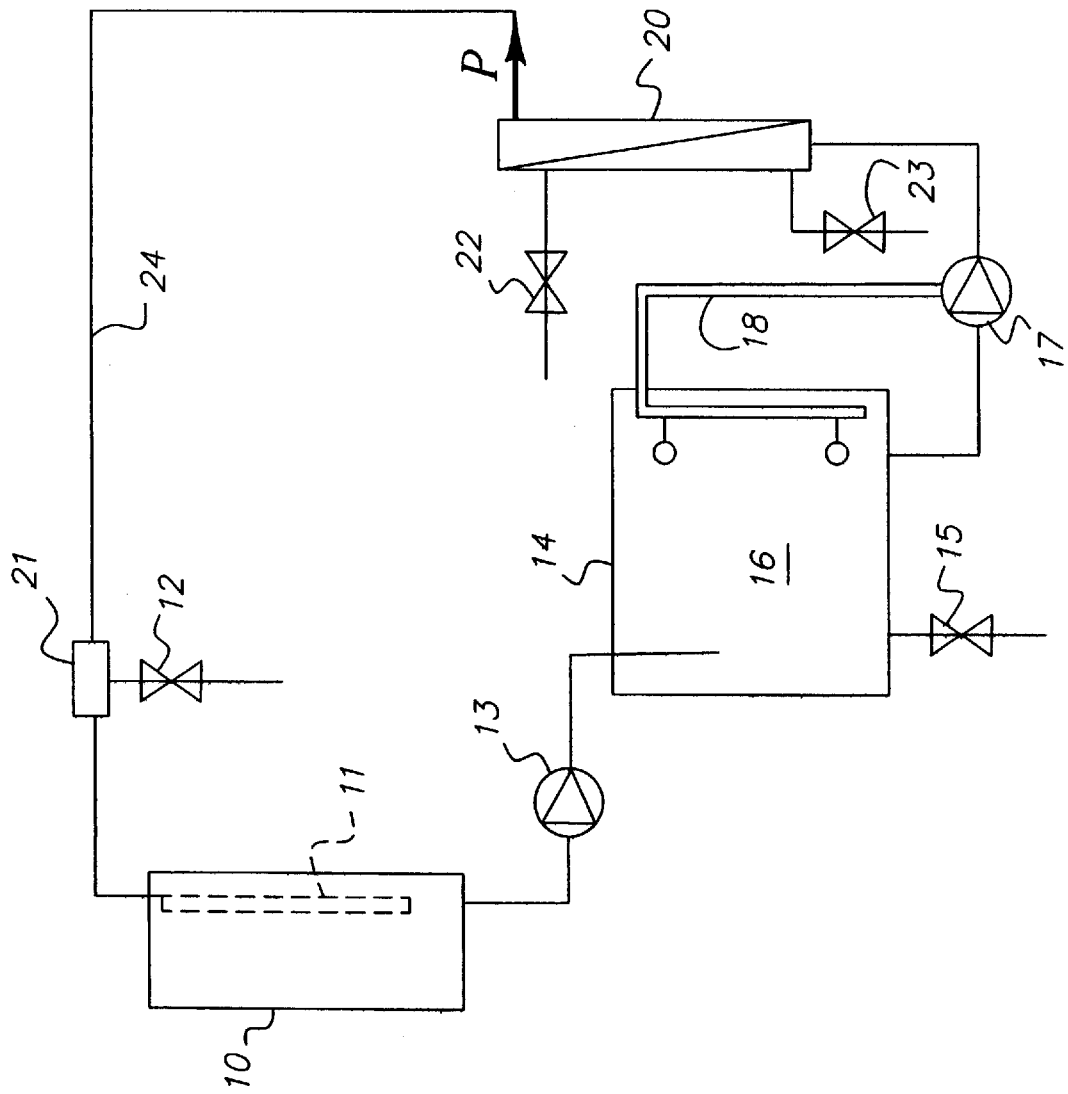
FIG. 1 represents a particular embodiment of the method according to the present invention.

The method according to the invention can be implemented especially during the processing of Eastman Color Negative® films supplied by Eastman Kodak. These films, intended for the cinema, have a backing layer containing carbon particles, this layer being removable by passing through a prebath and then washing implemented at the start of the development process.

Analysis of the wash-water shows that the particles contained in the wash-water from treating Eastman Color Negative® products, have a size between 0.2 µm and 20 µm, the average particle size being 0.41 µm.

In the method of the invention a PTFE-based microfiltration membrane is used having porosity between 0.1 µm and 0.2 µm. Such a membrane can be a pleated membrane supplied for example by Domnick Hunter under the name TETPOR, by Pall under the name Septra®, by Osmonics under the name Memtrex® or by Vokes under the name Fluorofil®. The filtering pressure is adjusted according to the volume treated to obtain the best compromise in terms of permeate flow It is also important not to foul the microfiltration membrane.

According to one embodiment, prefiltering can be carried out, for instance by filtration through a polypropylene-based filter, before the microfiltration treatment, to remove the large sized particles.

One example of the embodiment of the method according to the invention is illustrated in FIG. 1, showing the microfiltration unit functioning in closed loop. The film to be processed (not shown) is introduced into the processing installation that comprises, before the development step, a prebath (not shown) in which the film runs to soften the backing layer, and a first wash-tank 10 in which the backing layer is removed by rinsing using water jets created by the nozzles 11. The overflow of the first wash-tank 10 is sent through a transfer pump 13 into an intermediate tank 14 equipped with a bleed valve 15. The wash-water 16 contained in the intermediate tank 14 is sent back through a low pressure (1 bar to 10 bar) pump 17, controlled by a servo system 18, into the microfiltration unit 20 equipped with a membrane made of PTFE-based material and having porosity of 0.2 µm. After passing through the unit 20, a permeate P that is the recycled wash-water is recovered at the outlet and sent back to the first wash-tank 10 to resupply it with water, through a pipe 24. The installation has a water inlet 22 and a bleed-valve 23 to make a membrane rinsing circuit that enables the accumulation of carbon particles in the microfiltration unit housing to be prevented. The membrane can be cleaned by periodic backwash, as described in *Ultrafiltration and Microfiltration Hanbook, Munir Cheryan*, 1998, Technomic Publishing Company, page 268 The installation also has a mixer 21 that enables fresh water to be added to the recycled wash water resulting from the microfiltration unit 20 by opening valve 12. However, the method according to the invention enables 100% reuse of the recycled wash-water without extra addition of fresh water.

The treatment of the wash-water by microfiltration on a PTFE-based microfiltration membrane according to the method of the present invention enables at least 95% of carbon particles to be removed. The wash-water, thus treated, can then be recycled with a high efficiency of more than 90%. It is reinjected into the first wash-tank to again remove the backing layer from the film, with no need to add water. The method according to the invention thus enables water consumption to be reduced significantly. This recycling does not harm the properties of the film obtained, because no modification of the sensitometric properties or any physical defect of the film are observed.

The treatment, according to the invention, by microfiltration with a PTFE-based membrane of the wash-water resulting from the removal of the backing layer can be followed by an ultrafiltration treatment with a hydrophilic membrane whose surface is electrically charged, such as a acrylonitrile copolymer based membrane. This combination of the two treatments enables the removal of the carbon particles and dyes from the wash-water with high permeate flow rates, and extends the lifetime of the ultrafiltration membrane.

The invention is described in detail in the following examples.

EXAMPLES 1–3

A sample was taken from the wash-water resulting from the treatment to remove the backing layer of an Eastman Color Negative® film supplied by Eastman Kodak. This sample was prefiltered Experiment A) on a polypropylene-based PEPLYN PLUS® filter (supplied by Domnick Hunter), having porosity of 06 μm to remove the largest particles. The sample was then treated by microfiltration on the one hand (Experiment B) using a microfiltration membrane, PREPOR-PES® (Domnick Hunter), based on polyethersulfone (hereafter called PES), and on the other hand (Experiments 1 to 3) using a microfiltration membrane made in a PTFE-based material. For example a TETPOR-PTFE® (Domnick Hunter) membrane was chosen.

These membranes have more or less equivalent surface areas (0.6 m² to 0.7 m²). The porosity of these PES- and PTFE-based membranes (Experiments B and 1) is identical at 0.1 μm. Two other microfiltration membranes, PTFE-based TETPOR-PTFE®, were tested, one (Experiment 2) having porosity of 0.2 μm, the other (Experiment 3) having porosity of 0.45 μm.

The tests were carried out for 10-liter samples, the filtering pressure being adjusted according to the treated volume to obtain the best compromise in terms of permeate flow. The applied conditions of permeate pressure and flow rate are given in Table I.

Table I

| Experiment | Membrane | Porosity (μm) | Pressure (Bar) | Permeate flow (l/h.m²) |
|---|---|---|---|---|
| A/control | PP-PEPLYN | 0.6 | 0.1 | 456 |
| B/control | PES-PREPOR | 0.1 | 0.7 | 392 |
| 1/invention | PTFE-TETPOR | 0.1 | 5.0 | 200 |
| 2/invention | PTFE-TETPOR | 0.2 | 4.3 | 464 |
| 3/invention | PTFE-TETPOR | 0.45 | 2 | 457 |

To determine the efficiency of the microfiltration, the transmittance of the resulting permeate was measured with a spectrometer at a wavelength of 265 nm. The higher the transmittance, the fewer the carbon particles remaining in the permeate. The transmittance measurements were carried out quickly in the 30 minutes following the microfiltration because the phenomena of precipitation due to the aggregation of the carbon particles was then observed.

Also the color of the resulting permeate was noted.

The results obtained are given in Table II below.

TABLE II

| Experiment | Membrane | Porosity (μm) | Transmittance (%) | Permeate color |
|---|---|---|---|---|
| Start | — | — | 28 | Black |
| A/control | PP-PEPLYN | 0.6 | 31 | Black |
| B/control | PES-PREPOR | 0.1 | 47 | Gray-black |
| 1/invention | PTFE-TETPOR | 0.1 | 80 | Yellowish |

The color and transmittance measurements given in Table II demonstrate, unexpectedly, that only the PTFE-based microfiltration membrane allowed to remove a large part of carbon particles (at least 95%). With the polypropylene-based membrane, no significant change of transmittance was observed. Practically no carbon particles were removed. On the other hand, at equal porosity level, the carbon particles were not sufficiently retained by the PES-based membrane compared with the PTFE-based one.

This behavior may be explained by the fact that the PTFE-based membrane develops electrostatic charges thus encouraging the aggregation of the carbon particles. This difference observed for the filtration properties could be corroborated with the membranes' electrical properties, especially volume resistivity. Table III gives the volume resistivity values according to the membrane type, as well as the transmittance shown in Table II: the higher the volume resistivity, the greater the number of carbon particles retained.

TABLE III

| Membrane | Volume resistivity (Ω cm) | Transmittance (%) |
|---|---|---|
| Polypropylene | $10^{16}$ | 31 |
| Polyethersulfone | $10^{17}$ | 47 |
| Polytetrafluorethylene | $10^{18}$ | 80 |

On the other hand, during another experiment, a sample of wash-water resulting from the treatment to remove the backing layer of an Eastman Color Negative® film was placed in an electrolysis cell equipped with two stainless steel electrodes and subjected to a low current (U=3 volts, I=10 mA) for six hours to avoid electrolysis phenomena. After a period of at least two weeks, it can be seen that all the carbon particles have settled at the bottom of the electrolysis cell whereas, in the check sample, the carbon particles are still well dispersed as at the start of the experiment. This experiment is consistent with the hypothesis by which electrical phenomena encourage the agglomeration of carbon particles. However, this hypothesis in no way limits the scope of the present invention as claimed.

EXAMPLES 4–6

The PES-based microfiltration membrane (experiment B') and the PTFE-based microfiltration membranes with various porosities (experiments 4 to 6) mentioned in Table IV were tested.

TABLE IV

| Experiment | Membrane | Porosity (μm) | Pressure (Bar) |
|---|---|---|---|
| B'/control | PES-PREPOR | 0.1 | 0.7 |
| 4/invention | PTFE-TETPOR | 0.1 | 5.0 |

TABLE IV-continued

| Experiment | Membrane | Porosity (μm) | Pressure (Bar) |
|---|---|---|---|
| 5/invention | PTFE-TETPOR | 0.2 | 4.3 |
| 6/invention | PTFE-TETPOR | 0.45 | 2 |

The conditions of pressure and volume treated (10 liters) are the same as Examples 1–3. The tests were carried out without prefiltration on a polypropylene-based filter and reproduced over several cycles to determine the membrane fouling propensity.

The change of the permeate flow was measured during various cycles. The results are given in Table V. Then a sample of the permeate obtained after the second cycle was taken and the transmittance, chemical oxygen demand (COD), and the total organic carbon (TOC) were measured. The total organic carbon (TOC) is measured according to standard AFNOR NF T90-102 June 1985, the chemical oxygen demand (COD) is measured according to standard AFNOR NF T90-101. The results of these measurements are shown in Table VI.

TABLE V permeate flow variation (l/hm$^2$)

| Membrane | Cycle 1 | Cycle 2 | Cycle 3 |
|---|---|---|---|
| PES-0.1 μm/B' | 392 | 264 | — |
| PTFE-0.1 μm/4 | 200 | 207 | 214 |
| PTFE-0.2 μm/5 | 464 | 457 | 457 |
| PTFE-0.45 μm/6 | 457 | 437 | 434 |

TABLE VI

Comparison of separation performance

| Membrane | Transmittance (%) | COD ppm | TOC ppm | Color |
|---|---|---|---|---|
| Start | 12 | 58 | 36 | Black |
| PES-0.1 μm/B' | 69 | 51 | 26 | Black |
| PTFE-0.1 μm/4 | 70 | 38 | 16 | Yellowish |
| PTFE-0.2 μm/5 | 75 | 38 | 16 | Yellowish |
| PTFE-0.45 μm/6 | 67 | 38 | 21 | Black |

Table VI demonstrates that the PES-based microfiltration membrane enables a large number of carbon particles to be retained. However, Table V demonstrates that the PES-based microfiltration membrane has caused a very significant reduction of the permeate flow due to the fouling of the pores. Therefore such a membrane cannot be used because of this fouling tendency. Unexpectedly, only the PTFE-based microfiltration membranes have good separation capacity for better retention of the carbon particles, and a low fouling propensity, despite the absence of prefiltration. In addition, Tables V and VI demonstrate clearly that the PTFE-based microfiltration membranes having porosity of 0.1 μm to 0.2 μm are particularly efficient, In particular, a PTFE-based microfiltration membrane having porosity of 02 μm is preferred because it enables a removal of carbon particles similar to that obtained with a PTFE microfiltration membrane of porosity 0.1 μm, however with a better permeate flow rate.

EXAMPLE 7

300 liters of wash-water resulting from the treatment to remove the backing layer of an ECN® film were treated using a PTFE-based microfiltration membrane TETPOR-PTFE® supplied by Domnick Hunter, having porosity of 0.2 μm, without prefiltration, at 3.1 bar with a permeate flow of 446 1/hm$^2$ and a recovery rate of 81%. The microfiltration unit was mounted in closed loop with the ECN® films processing device (see FIG. 1) to enable a continuous filtering process of the wash-water recovered in the intermediate tank, the wash-water thus filtered being reinjected into the first wash-tank, without extra addition of water during the test.

The processing conditions are described in the "Manual for Processing Eastman Kodak Motion Picture Films, Process H 24", EKC, 1990, for processing ECN® films. Sensitometric measurements were carried out for two types of ECN® films, i.e. film 5274 VISION 200T and film 5289 VISION 800T. The sensitometry was measured at the start of the process (when fresh water is used in the first wash-tank) and at the end of recycling 243 liters of the wash-water resulting from the first wash-tank having been treated according to the invention. The results are given in Table VII.

TABLE VII

| | 5274 VISION 200T | | 5289 VISION 800T | |
|---|---|---|---|---|
| Parameters | Fresh water in the first wash-tank | Recycled water in the first wash-tank | Fresh water in the first wash-tank | Recycled water in the first wash-tank |
| Dmin | | | | |
| Red | 0.162 | 0.161 | 0.174 | 0.171 |
| Green | 0.562 | 0.564 | 0.567 | 0.562 |
| Blue | 0.898 | 0.902 | 0.991 | 0.972 |
| Speed | | | | |
| Red | 513.8 | 511.9 | 574.3 | 571.6 |
| Green | 525.9 | 525.7 | 576.4 | 573.7 |
| Blue | 517.7 | 512.3 | 553.2 | 550.1 |
| Contrast | | | | |
| Red | 0.467 | 0.461 | 0.471 | 0.470 |
| Green | 0.521 | 0.526 | 0.577 | 0.586 |
| Blue | 0.562 | 0.564 | 0.570 | 0.573 |

Dmin = minimum density corresponding to a part of the unexposed film (support + fog).
Speed = 100 × (3-Log H), H being the exposure at the density point 0.20 + Dmin.
Contrast = slope of the least squares line between the density point Dmin + 0.20 and that corresponding to an exposure of more than +1.35 Log H.

Dmin=minimum density corresponding to a part of the unexposed film (support+fog).

Speed=100×(3-Log H), H being the exposure at the density point 0.20+Dmin.

Contrast slope of the least squares line between the density point Dmin+0.20 and that corresponding to an exposure of more than +1.35 Log H.

Table VII clearly shows that for the developed ECN® films no significant sensitometric difference or any physical defect is observed. The recycling of the wash-water enables water consumption to be reduced 80% for the backing layer removal step.

PART LIST

| | |
|---|---|
| 10 | Wash-tank |
| 11 | Nozzles |
| 12 | Valve |
| 13 | Transfer pump |
| 14 | Intermediate tank |
| 15 | Bleed valve |
| 16 | Wash-water |
| 17 | Pump |
| 18 | Servo system |
| 20 | Microfiltration unit |
| 21 | Mixer |
| 22 | Water inlet |
| 23 | Bleed valve |
| 24 | Pipe |

What is claimed is:

1. A method of recycling wash-water resulting from the treatment of a film provided with a carbon particles based backing layer, said treatment comprising a washing treatment to remove said carbon particles based backing layer, wherein said method comprises the step of passing said wash-water through an microfiltration unit equipped with a microfiltration membrane made of polytetrafluorethylene-based material, wherein a permeate is obtained, and wash-water free of said carbon particles is obtained in said permeate.

2. The method of claim 1, comprising the step of recovering wash-water from the permeate and recycling it for said washing treatment.

3. The method of claim 1, wherein said polytetrafluorethylene-based microfiltration membrane has porosity between 0.1 $\mu$m and 0.2 $\mu$m.

4. The method of claim 1, comprising the step of prefiltering the wash-water through a polypropylene-based filter.

5. The method of claim 4, wherein the polypropylene-based filter has porosity more or less equal to 0.6 $\mu$m.

* * * * *